(12) United States Patent
Kim et al.

(10) Patent No.: US 8,624,449 B2
(45) Date of Patent: Jan. 7, 2014

(54) LINEAR VIBRATION MOTOR

(75) Inventors: Yong Jin Kim, Gyunggi-do (KR); Kyung Ho Lee, Gyunggi-do (KR); Jun Kun Choi, Gyunggi-do (KR); Hwa Young Oh, Seoul (KR)

(73) Assignee: Samsung Electro-Mechanics Co., Ltd, Gyunggi-Do (KR)

(*) Notice: Subject to any disclaimer, the term of this patent is extended or adjusted under 35 U.S.C. 154(b) by 372 days.

(21) Appl. No.: 13/030,018

(22) Filed: Feb. 17, 2011

(65) Prior Publication Data
US 2012/0169148 A1 Jul. 5, 2012

(30) Foreign Application Priority Data
Dec. 31, 2010 (KR) .................. 10-2010-0139974

(51) Int. Cl.
*H02K 33/00* (2006.01)
*H02K 33/16* (2006.01)

(52) U.S. Cl.
USPC ............................................ 310/25; 310/28

(58) Field of Classification Search
USPC .................................. 310/15, 17, 25, 28–29
See application file for complete search history.

(56) References Cited

U.S. PATENT DOCUMENTS

| | | | | |
|---|---|---|---|---|
| 5,736,797 | A * | 4/1998 | Motohashi et al. | 310/36 |
| 6,441,571 | B1 * | 8/2002 | Ibuki et al. | 318/114 |
| 7,355,305 | B2 * | 4/2008 | Nakamura et al. | 310/12.03 |
| 7,420,314 | B2 * | 9/2008 | Fujita et al. | 310/263 |
| 7,999,421 | B2 * | 8/2011 | Kim et al. | 310/15 |
| 8,269,379 | B2 * | 9/2012 | Dong et al. | 310/25 |
| 2011/0101797 | A1 * | 5/2011 | Lee et al. | 310/29 |
| 2011/0316361 | A1 * | 12/2011 | Park et al. | 310/25 |

* cited by examiner

*Primary Examiner* — Burton Mullins
(74) *Attorney, Agent, or Firm* — Ladas & Parry, LLP

(57) ABSTRACT

Disclosed herein is a linear vibration motor, including: a fixing part, a vibrator part vibrating in a horizontal direction, and an elastic member coupled with the outer side of the vibrator part and a round-shaped bending part to elastically support the fixing part opposite to the vibrator part linearly vibrating in a horizontal direction.

16 Claims, 7 Drawing Sheets

LINEAR VIBRATION MOTOR

CROSS REFERENCE TO RELATED APPLICATION

This application claims the benefit of Korean Patent Application No. 10-2010-0139974, filed on Dec. 31, 2010, entitled "Linear Vibration Motor" which is hereby incorporated by reference in its entirety into this application.

BACKGROUND OF THE INVENTION

1. Technical Field

The present invention relates to a linear vibration motor.

2. Description of the Related Art

A general vibration motor, which is a component that uses a principle of generating electromagnetic force and converts electrical energy into mechanical vibrations, is mounted in mobile communication terminals, portable terminals, or the like, to silently notify a call to a user.

Recently, a linear vibration motor has been generally used as a vibration motor. The linear vibration motor is generally disposed at a corner portion of a device to generate vibrations in a direction vertical to an object receiving vibrations.

As shown in FIG. 1, the linear vibration motor may be configured to include a fixed part 10, a vibrator part 20, and an elastic member 25 coupled with the fixing fixed part 10 to elastically support the vibrator part 20.

Further, the fixed part 10 may be configured to include a bracket 11, a coil 12, a printed circuit board 13, and a case 14 and the vibrator part 20 may be configured to include a yoke 21, a weight body 22, a magnet 23, and a plate yoke 24.

The linear vibration motor may be generally changed according to a design, but has a dimension of about 10 mm in outer diameter and 4 mm in thickness.

However, the linear vibration motor designed to be vibrated in a vertical direction has a limitation in thickness in that it is not linearly vibrated until a space of about 4 mm in thickness in which the weight body installed in the vibrator may move up and down in order to generate vibrations.

Further, in order to increase vibration volume, increasing the thickness of the linear vibration motor restricts the space where the components can be mounted in the device.

SUMMARY OF THE INVENTION

The present invention has been made in an effort to provide a linear vibration motor vibrated in a horizontal direction including an elastic member coupled with an outer side of a weight body and including having a bending part to elastically support a fixed part.

According to a preferred embodiment of the present invention, there is provided a linear vibration motor, including: a fixed part including a coil applied with power from the outside; a vibrator part disposed to be opposite to the coil and including a plurality of magnets having polarities disposed to be opposite to each other and vibrating in a horizontal direction; and an elastic member coupled with the outer side of the vibrator part and include a round-shaped bending part to elastically support the fixed part opposite to the vibrator part linearly vibrating in a horizontal direction.

The vibrator part may further include a weight body coupled with the plurality of magnets.

The weight body may be provided with a receiving groove in order to receive the plurality of magnets therein.

The vibrator part may be coupled with a plate yoke coupled between the plurality of magnets to increase the collection of magnetic force.

The fixed part may include: a bracket; a printed circuit board coupled with the inner top surface of the bracket; and a case formed with an inner space and coupled with the bracket to cover the bracket, wherein the coil is coupled with the printed circuit board.

The printed circuit board may include: a connection terminal protruded to one side in order to be connected with external components; and circuit patterns for applying power to the coil formed on the upper portion thereof.

The case may be provided with a step part corresponding to the connection terminal in order to expose the connection terminal to the outside.

The elastic member may include: a first elastic member coupled with one side of the weight body to elastically support both sides of the fixed part opposite to the vibration direction of the vibrator part; and a second elastic member coupled with the other side of the weight body to elastically support both sides of the fixed part opposite to the vibration direction of the vibrator part.

The first elastic member may include: a coupling part coupled with one side of the weight body; a U-letter shaped elastic support part elastically supporting both sides of the fixed part opposite to the vibration direction of the vibrator part; and a round-shaped bending part connecting the coupling part with the elastic support part.

The second elastic member may include: a coupling part coupled with the other side of the weight body; a U-letter shaped elastic support part elastically supporting both sides of the fixed part opposite to the vibration direction of the vibrator part; and a round-shaped bending part connecting the coupling part with the elastic support part.

The weight body may include a round shape on a surface corresponding to the bending part formed in the elastic member.

According to another preferred embodiment of the present invention, there is provided a linear vibration motor, including: a fixed part including a plurality of magnets of which polarities are disposed to be opposite to each other; a vibrator part disposed to be opposite to the plurality of magnets and including a coil applied with power from the outside and vibrating in a horizontal direction; and an elastic member coupled with the outer side of the vibrator part and including a round-shaped bending part to elastically support the fixed part opposite to the vibrator part linearly vibrating in a horizontal direction.

The vibrator part may include a weight body formed with a receiving groove in order to receive the coil therein and the weight body includes a round shape on a surface corresponding to the bending part of the vibrator part.

The fixed part may include: a bracket; a printed circuit board coupled with the inner top surface of the bracket and applying power to the coil; a case formed with an inner space and coupled with the bracket to cover the bracket; and a conducting member of which one end is fixedly coupled with the coil and the other end is fixedly coupled to the printed circuit board to apply power to the coil.

The elastic member may include: a first elastic member coupled with one side of the weight body to elastically support both sides of the fixed part opposite to the vibration direction of the vibrator part; and a second elastic member coupled with the other side of the weight body to elastically support both sides of the fixed part opposite to the vibration direction of the vibrator part.

The first elastic member may include: a coupling part coupled with one side of the weight body; a U-letter shaped elastic support part elastically supporting both sides of the fixed part opposite to the vibration direction of the vibrator part; and a round-shaped bending part connecting the coupling part with the elastic support part.

The second elastic member may include: a coupling part coupled with the other side of the weight body; a U-letter shaped elastic support part elastically supporting both sides of the fixed part opposite to the vibration direction of the vibrator part; and a round-shaped bending part connecting the coupling part with the elastic support part.

The fixed part may be coupled with a plate yoke coupled between the plurality of magnets to increase the collection of magnetic force.

The magnet may be selectively coupled with the case of the fixed part, the bracket, and the printed circuit board.

DESCRIPTION OF THE PREFERRED EMBODIMENTS

Figure 1:
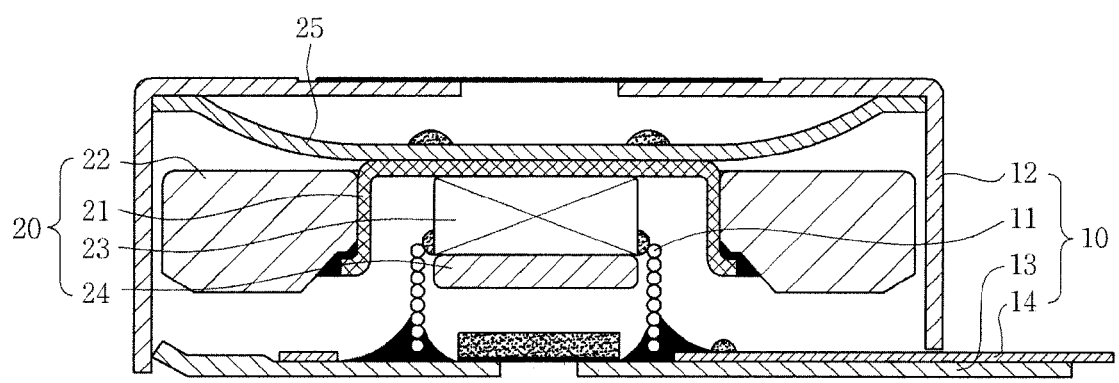
FIG. 1 is a cross-sectional view of a linear vibration motor according to the prior art.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, in describing the present invention, a detailed description of related known functions or configurations will be omitted so as not to obscure the subject of the present invention. Further, when it is determined that the detailed description of the known art related to the present invention may obscure the gist of the present invention, the detailed description will be omitted.

Hereinafter, the preferred embodiments of the present invention will be described in detail with reference to the accompanying drawings.

First Preferred Embodiment

Figure 2:
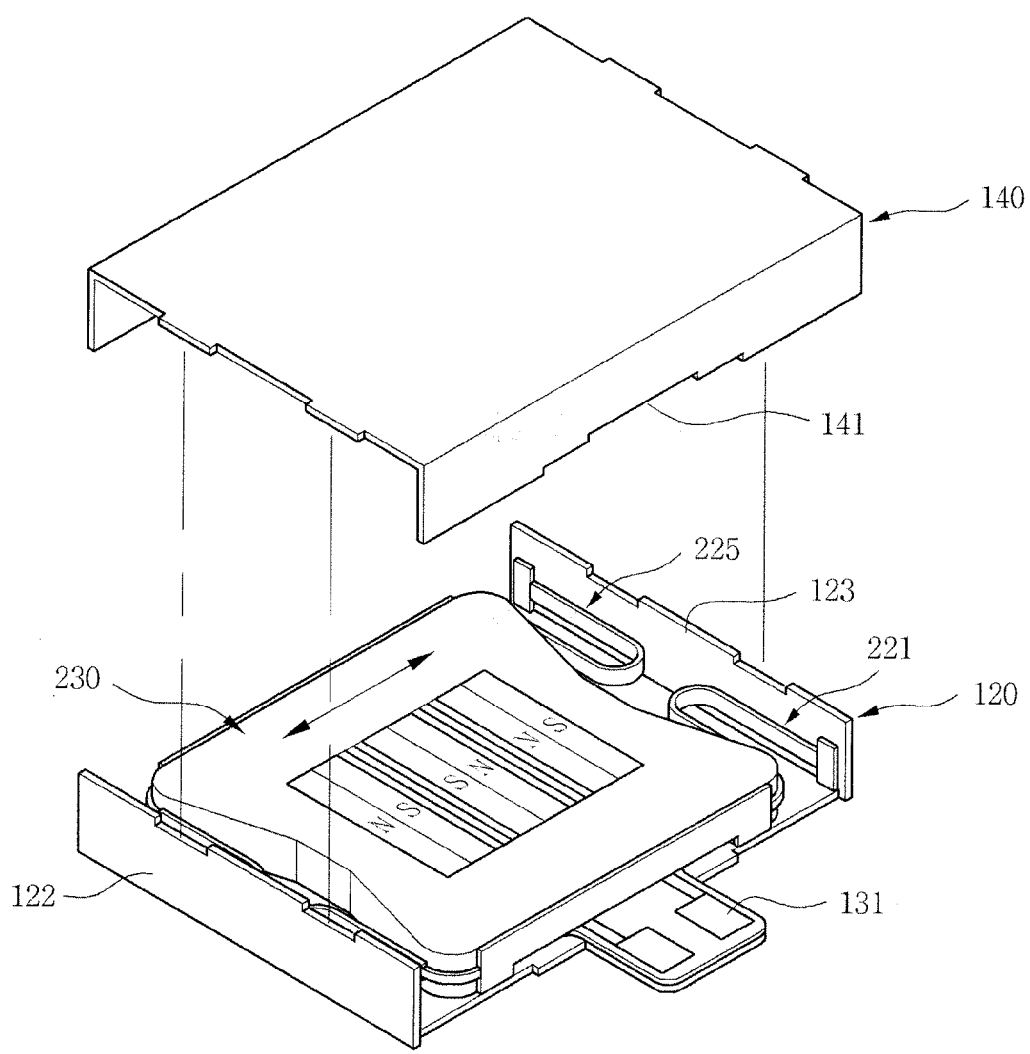
FIG. 2 is a perspective view of a linear vibration motor according to a first preferred embodiment of the present invention.

FIG. 2 is a coupling perspective view of a vibrator according to a first preferred embodiment of the present invention. As shown in FIG. 2, the linear vibration motor may be configured to include a fixed part and a vibrator part.

The fixed part may be configured to include a coil 110, a bracket 120, a printed circuit board 130, and a case 140 and the vibrator part may be configured to include a plurality of magnets 211, 212, and 213, a plurality of elastic members 221 and 225, a weight body 230, and a plate yoke 240.

Figure 3:
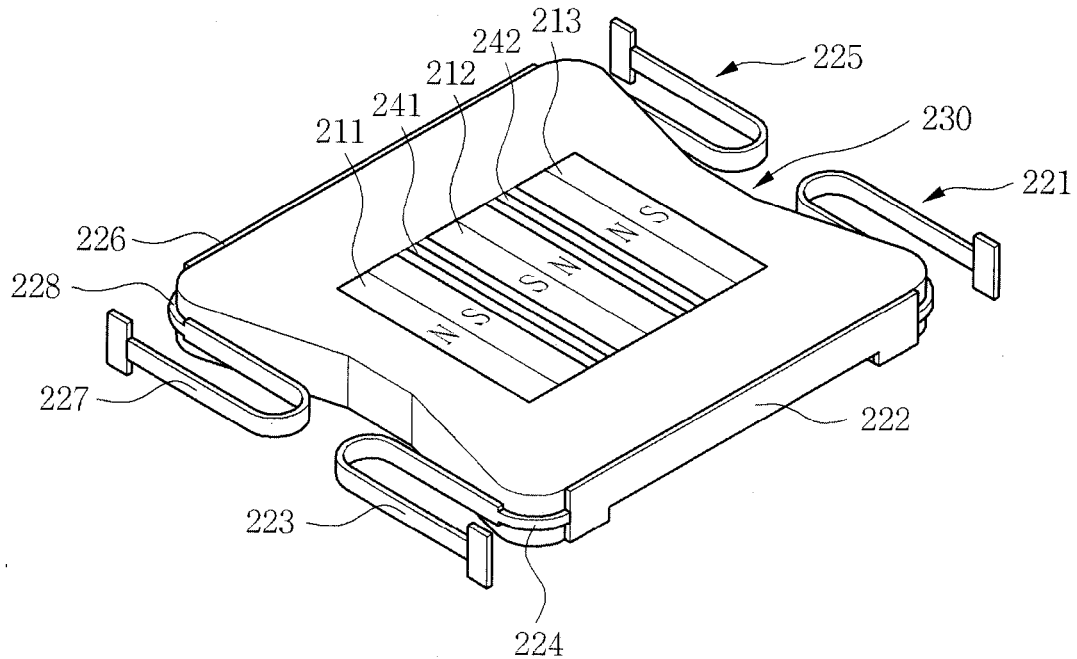
FIG. 3 is a perspective view of a vibrator part configuring a linear vibration motor shown in FIG. 2.
Figure 4:
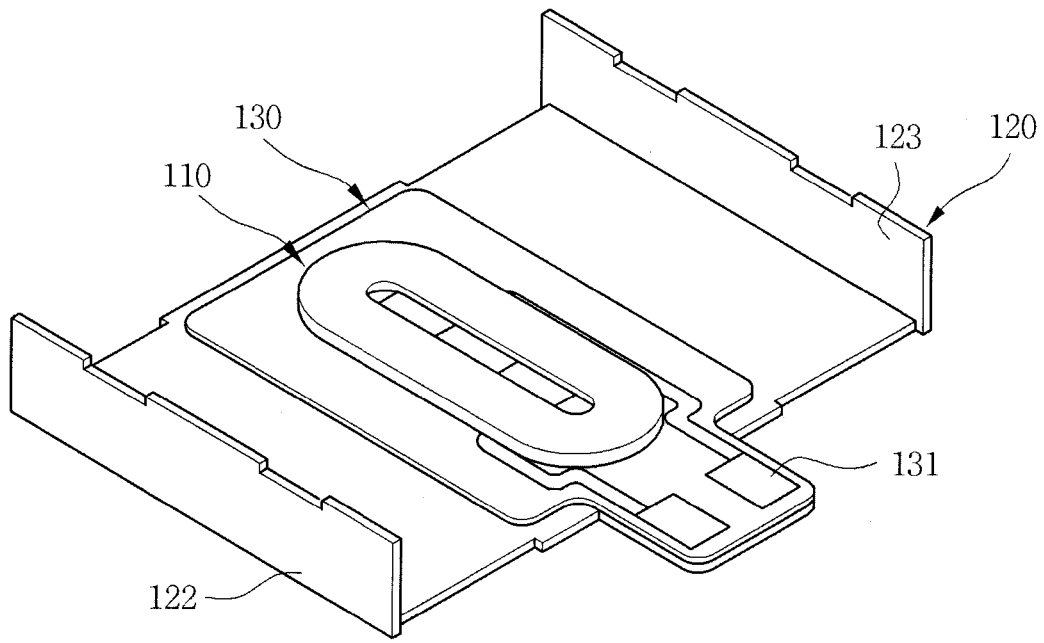
FIG. 4 is a perspective view of a fixed part configuring a linear vibration motor shown in FIG. 2.
Figure 5:
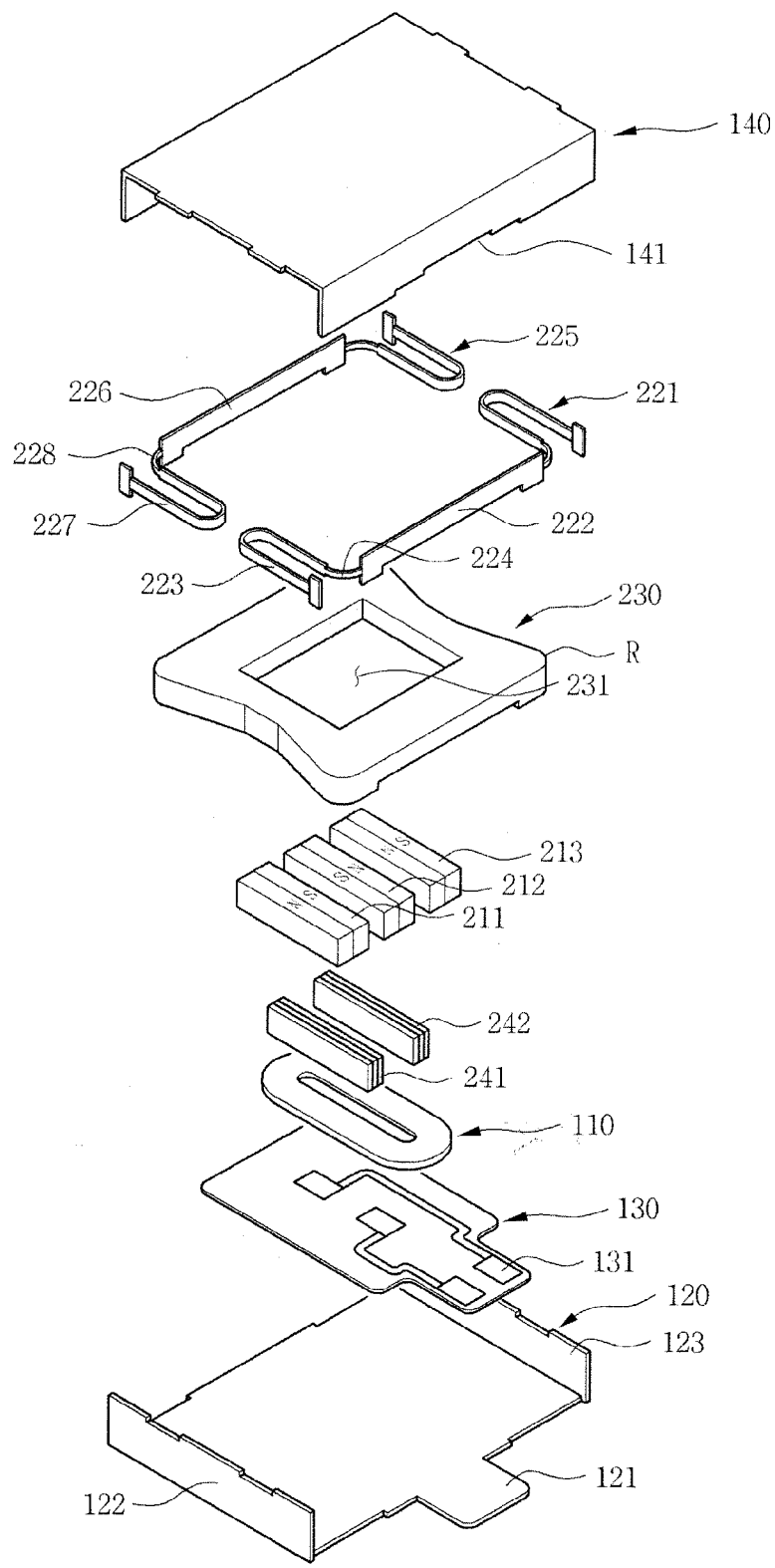
FIG. 5 is an exploded perspective view of a linear vibration motor according to the first preferred embodiment of the present invention.

FIG. 3 is a perspective view of a vibrator part configuring a linear vibration motor shown in FIG. 2 and FIG. 4 is a perspective view of a fixed part configuring a linear vibration motor shown in FIG. 2.

In detail, the coil 110 is coupled with the upper portion of the printed circuit board 130.

The printed circuit board 130 is provided with circuit patterns (not shown) in order to apply external power to the coil 110 and includes a connection terminal 131 protruded to one side to connect to external components.

The inner upper portion of the bracket 120 is fixedly coupled with the printed circuit board 130 and the upper thereof is formed with an inner space and is coupled with the case 140 to cover the upper portion of the bracket 120.

The bracket 120 is formed with sides 122 and 123 corresponding to the vibration motion direction of the vibrator part that vibrates in a horizontal direction.

The case 140 is formed with a step part 141 corresponding to the connection terminal 131 in order to expose the connection terminal 131 formed on one side of the printed circuit board 130 to the outside.

The polarities of the plurality of magnets 211, 212, and 213 generating electromagnetic force by the electromagnetic induction with the coil 110 are disposed to be opposite to each other.

In more detail, as shown in FIGS. 2 and 3, the preferred embodiment of the present invention uses three magnets 211, 212, and 213, which are disposed to have polarities opposite to each other in an arrangement order of N-S, S-N, and N-S.

Further, the arrangement order of polarities of the plurality of magnets 211, 212, and 213 is not limited thereto. However, the polarities should be disposed to be opposite to each other.

Therefore, the magnetic flow is induced in a right direction to current in the coil 110 according to the magnetic repulsive force generated among the plurality of magnets 211, 212, and 213 and it is possible to prevent the sagging phenomenon of the elastic member 220 due to the attraction of the plurality of magnets 211, 212, and 213.

When the material of the bracket 120 is made of a magnetic material, it is possible to prevent uniform straightness of the vibrator part and non-generation of the vibration motion due to the magnetic force that may be generated between the bracket 120 and the plurality of magnets 211, 212, and 213.

In order to increase the magnetic flux collection, a plurality of yokes 241 and 242 are coupled among the plurality of magnets 211, 212, and 213.

In more detail, the plate yoke 241 is coupled between the magnet 211 and the magnet 212 and the plate yoke 242 is coupled between the magnet 212 and the magnet 213.

Therefore, the number of plate yokes installed between the magnets is increased with the number of magnets of which polarities are disposed to be opposite to each other.

The weight body 230 is coupled with the plurality of magnets 211, 212, and 213. In more detail, the center of the weight body 230 is provided with a receiving groove 231, such that the plurality of magnets 211, 212, and 213 coupled with the plate yokes 241 and 242 are coupled in the weight body 230.

Further, the weight body 230 has a round (R) shape on a surface corresponding to the bending parts 224 and 228 of the elastic member 220 coupled with the outer side thereof.

In this configuration, the coil 110 and the plurality of magnets 211, 212, and 213 are disposed to be opposite to each other and generates the electromagnetic force by the electromagnetic induction, thereby horizontally vibrating the weight body 230.

The elastic members 221 and 225 are coupled with the outer side of the weight body 230. In more detail, the elastic members 221 and 225 are each coupled with one side of the weight body 230 and the other side of the first elastic member 221.

The first elastic member 221 and the second elastic member 225 elastically support the sides 122 and 123 of the bracket 120 to be opposite to the vibration direction of the vibrator part.

Therefore, the first elastic member 221 and the second elastic member 225 elastically support the vibration part in a horizontal direction, thereby making it possible to prevent the sagging phenomenon caused by the load of the vibration part.

In addition, the first elastic member 221 and the second elastic member 225 are integrally formed to be symmetrical left and right and are made of the same material.

Therefore, it is possible to prevent assembling eccentricity between the first elastic member 221 and the second elastic member 225 and constantly maintain the spring constant.

As shown, the first elastic member 221 may be configured to include a coupling part 222, an elastic support part 223, and a bending part 224.

In more detail, the coupling part 222 is fixedly coupled with one side of the weight body 230.

In addition, the elastic support part 223 is formed in the shape of a "U"-letter to elastically support one side 122 and the other side 123 of the bracket 120 opposite to the vibration direction of the vibrator part.

The bending part 224 connects the coupling part 222 with the elastic support part 223 and is formed in a round shape.

The structure and shape of the second elastic member 225 is the same as those of the first elastic member 221 and therefore, the description of the second elastic member 225 will be omitted.

Therefore, the vibration stress applied to the first elastic member 221 and the second elastic member 225 is reduced in the bending parts 224 and 228, such that it is possible to prevent fatigue failure of the first elastic member 221 and the second elastic member 225 due to vibration stress.

Therefore, the lifespan of the first elastic member 221 and the second elastic member 225 can be increased.

The angle of the round-shaped bending parts 224 and 228 is variously changed, such that the design range of the resonance frequency can be increased according to the design of the horizontal vibrator.

Second Preferred Embodiment

Figure 6:
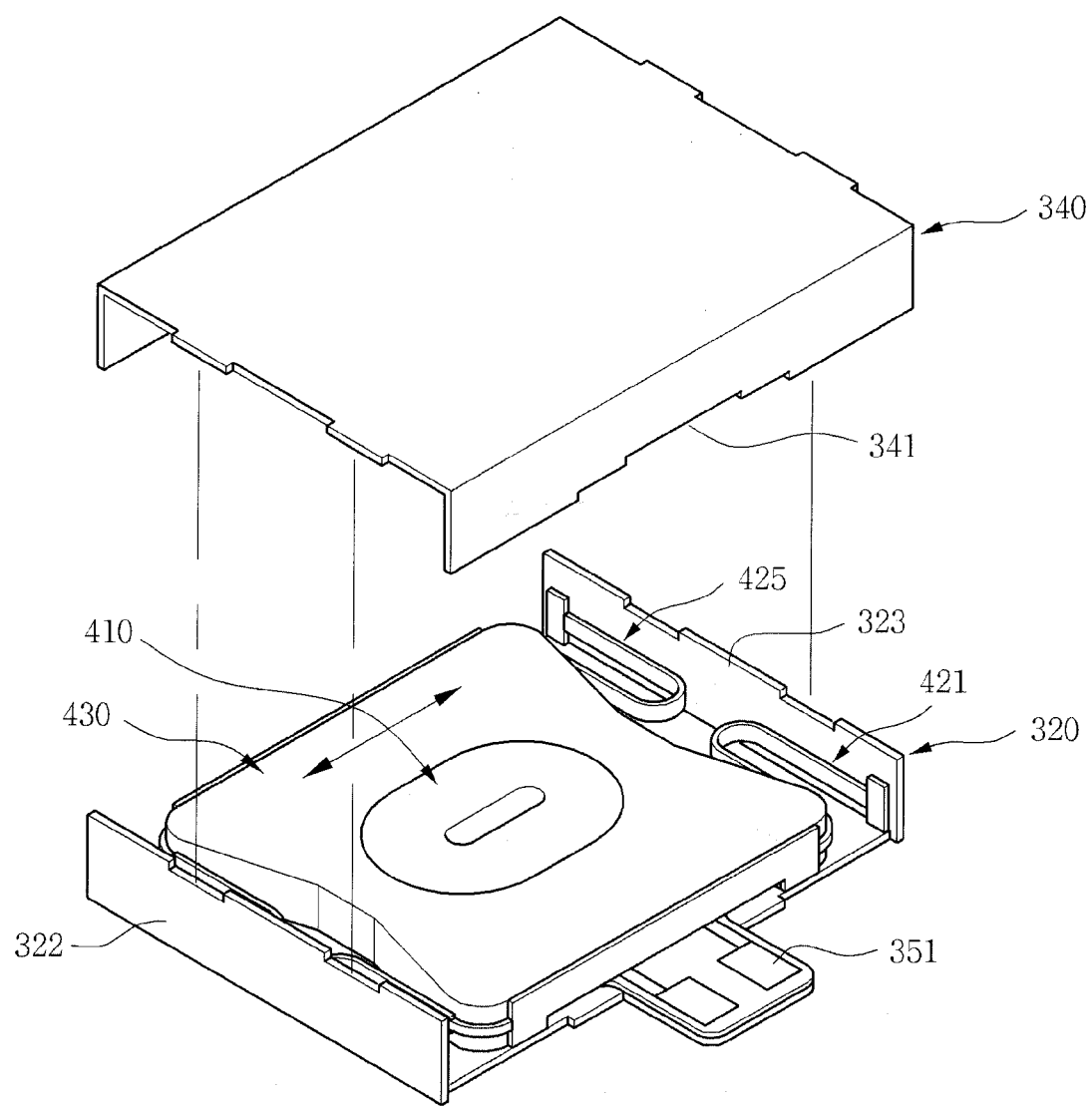
FIG. 6 is a perspective view of a linear vibration motor according to a second preferred embodiment of the present invention.
Figure 7:
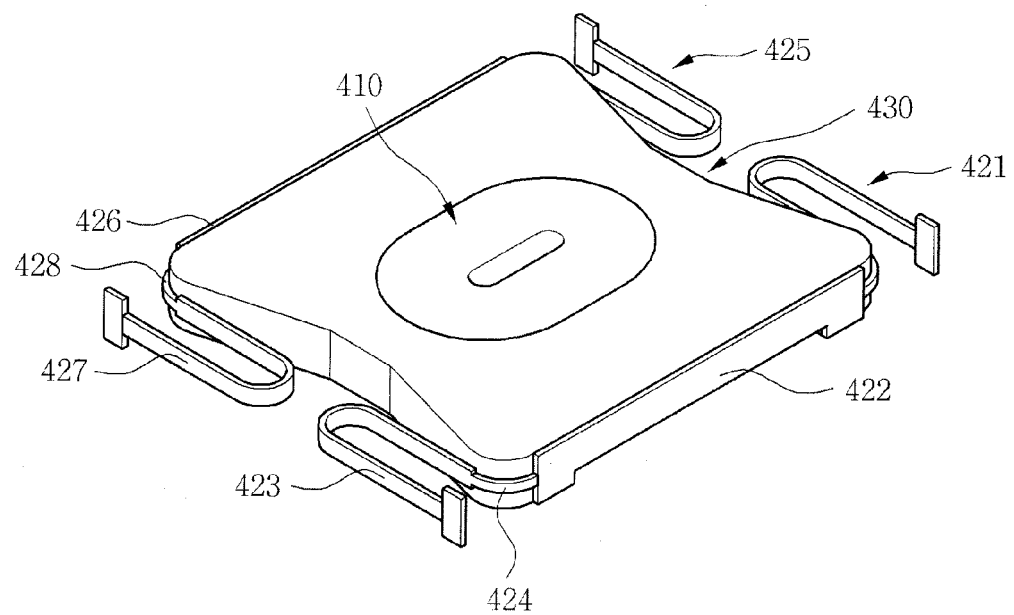
FIG. 7 is a perspective view of a vibrator part configuring the linear vibration motor shown in FIG. 6.
Figure 8:
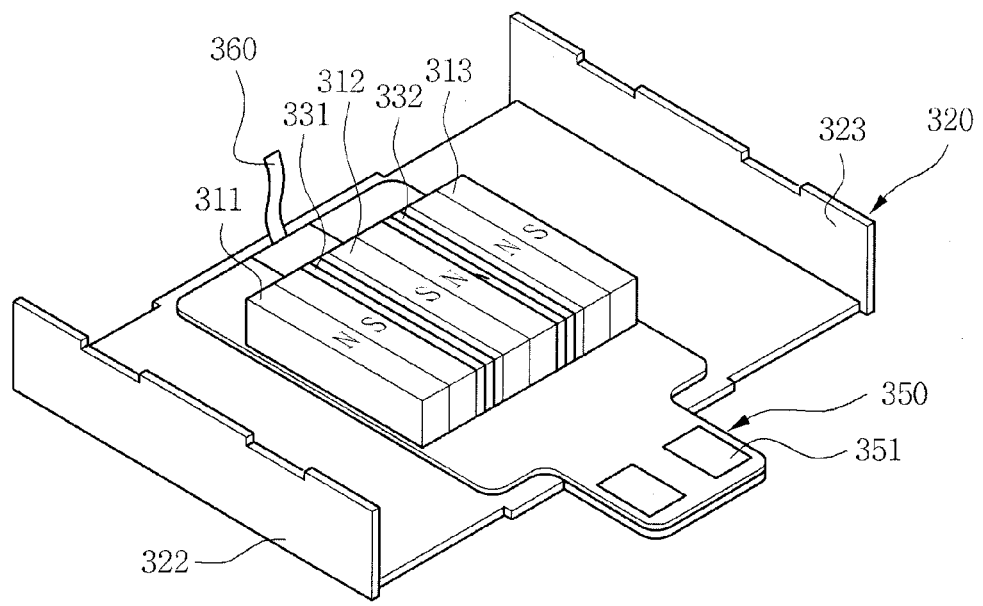
FIG. 8 is a perspective view of a fixed part configuring the linear vibration motor shown in FIG. 6.
Figure 9:
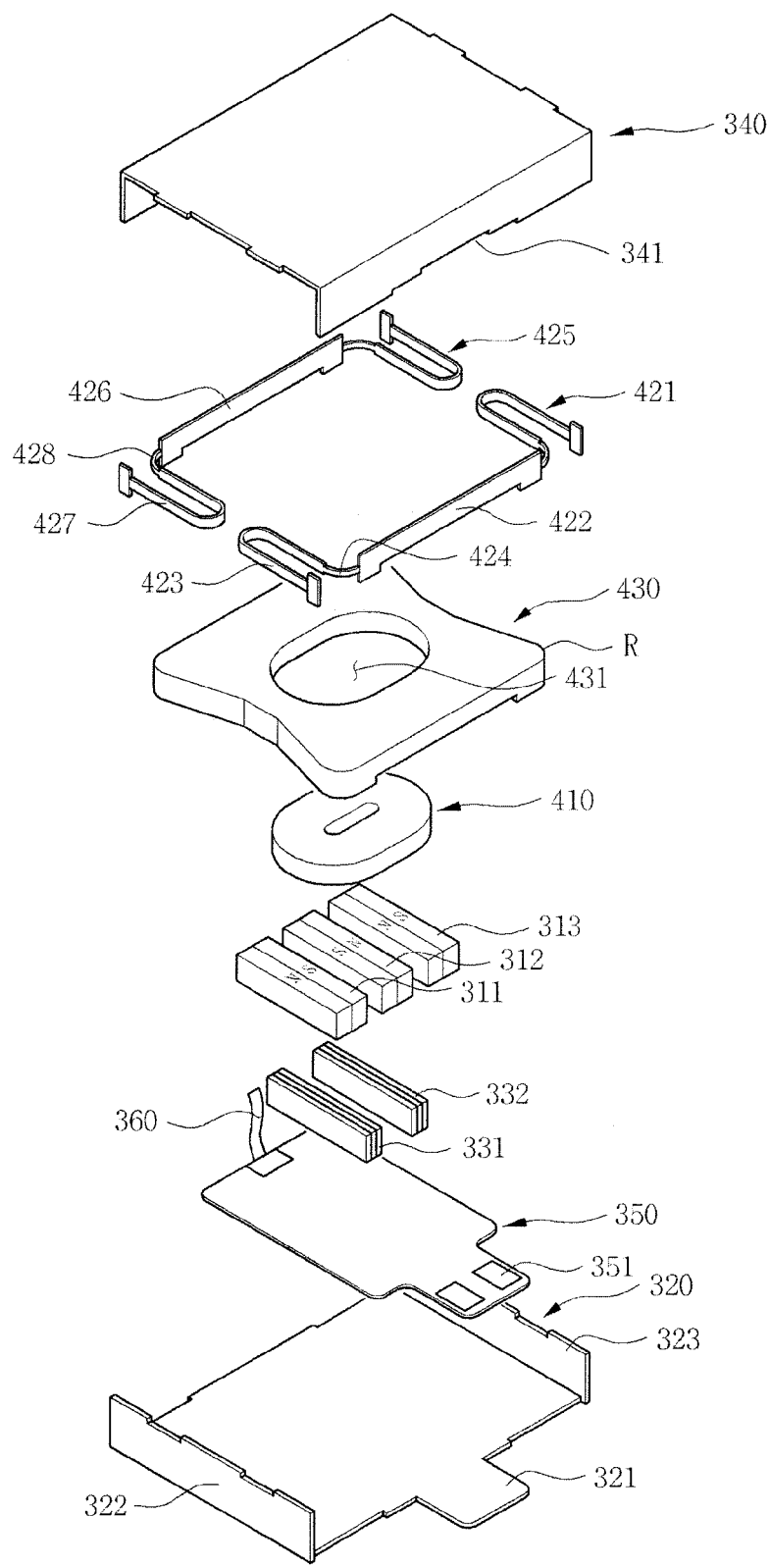
FIG. 9 is an exploded perspective view of the linear vibration motor according to the second preferred embodiment of the present invention.

FIG. 6 is a perspective view of a linear vibration motor according to a second preferred embodiment of the present invention, FIG. 7 is a perspective view of a vibrator part configuring the linear vibration motor shown in FIG. 6, FIG. 8 is a perspective view of a fixed part configuring the linear vibration motor shown in FIG. 6, and FIG. 9 is an exploded perspective view of the linear vibration motor according to the second preferred embodiment of the present invention.

The technical features of the linear vibration motor according to a second preferred embodiment of the present invention is the same as the first preferred embodiment of the present invention and therefore, the technical features thereof will be omitted.

As shown, the linear vibration motor may be configured to include a fixed part 300 and a vibrator part 400.

The fixed part 300 may be configured to include a plurality of magnets 311, 312, and 313, a bracket 320, a plate yoke 330, a case 340, and a printed circuit board 350 and the vibrator part 400 may be configured to include a coil 410, an elastic member 420, and a weight body 430.

In detail, the coil 410 is connected with the printed circuit board 350 to be applied with power from the outside.

As shown, since the printed circuit board 350 is coupled with the inner top surface of the bracket 320, the fixed part 300 includes a conducting member 360 of which one end is fixedly coupled with the coil 410 and the other end is fixedly coupled with the printed circuit board 350 in order to apply power to the coil 410.

In addition, the outer side of the conducting member 360 may be made of a material having a non-conductor nature in order to prevent a short-circuit phenomenon occurring when the conducting member 360 contacts the plurality of magnets 311, 312, and 313.

In addition, the plurality of magnets 311, 312, and 313 of which polarities are disposed to be opposite to each other is coupled with the fixed part 300 to be opposite to the coil 410.

In more detail, the plurality of magnets 311, 312, and 313 may be selectively coupled with the bracket 320, the printed circuit board 350, and the case 340.

The top surface of the printed circuit board 350 may be provided with the circuit patterns (not shown). In more detail, since the short phenomenon occurs when the circuit patterns directly contact the plurality of magnets 311, 312, and 313, the circuit patterns may be formed to avoid contact by bypassing an area in which the circuit patterns are coupled with the plurality of magnets 311, 312, and 313.

Therefore, the plurality of magnets 311, 312, and 313 may be coupled with the top surface of the printed circuit board 350.

In addition, the printed circuit board 350 may include a hollow part (not shown) formed larger than the shape in which the plurality of magnets 311, 312, and 313 are coupled.

By this configuration, it is possible to prevent the circuit patterns formed on the printed circuit substrate 350 from directly contacting with the plurality of magnets 311, 312, and 313 by directly installing the plurality of magnets 311, 312, and 313 on the inner top surface of the bracket 320.

Therefore, the plurality of magnets 311, 312, and 313 may be coupled with the inner top surface of the bracket 320.

In addition, in order to apply external power to the coil 410, various methods other than the method described in the second preferred embodiment may be used and therefore, the preferred embodiment of the present invention is not limited to the method of applying external power to the coil 410 described in the second preferred embodiment of the present invention.

The coil 410 is coupled with the weight body 430 and the weight body 430 is provided with a receiving groove 431 to receive the coil 410 therein.

The upper portion of the bracket is formed with the inner space and is coupled with the case 340 to cover the upper portion of the bracket 320.

In more detail, as shown in FIG. 8, the second preferred embodiment of the present invention uses three magnets 311, 312, and 313, which are disposed to have polarities opposite to each other in an arrangement order of N-S, S-N, and N-S.

Further, the arrangement order of polarities of the plurality of magnets 311, 312, and 313 is not limited thereto. However, the polarities should be disposed to be opposite to each other.

Therefore, the magnetic flow is induced to a right direction to current flowing in the coil 410 according to the magnetic repulsive force generated between the plurality of magnets 311, 312, and 313.

As set forth above, the vibrator part according to the preferred embodiment of the present invention vibrates in a horizontal direction so as to implement of a thin linear vibration motor without increasing the thickness of the linear vibration motor.

In addition, the elastic member elastically supports the vibrator part in a horizontal direction to prevent a sagging phenomenon of the elastic member caused due to the load of the vibrator part.

Further, the elastic member includes the round-shaped bending part corresponding to the vibration motion generated in a horizontal direction to reduce vibration stress applied to the elastic member, thereby making it possible to improve the lifespan of the elastic member.

In addition, the angle of the round-shaped bending part formed in the elastic member are variously changed, thereby making it possible to increase the design range of the resonance frequency according to the design of the linear vibration motor.

Further, the elastic member is integrally formed to be symmetrical left and right and is made of the same material, thereby making it possible to prevent assembling eccentricity and constantly maintain the spring constant.

In addition, the preferred embodiment of the present invention uses the plurality of magnets, thereby making it possible to increase the electromagnetic force generated by the electromagnetic induction with the coil.

Further, the preferred embodiment of the present invention has the plurality of magnets of which polarities are disposed to be opposite to each other to generate the magnetic repulsive force, thereby preventing the sagging phenomenon of the elastic member due to the attraction of the plurality of magnets.

Further, the preferred embodiment of the present invention can improve the straightness of the vibration motion generated in the horizontal direction of the vibration part and can prevent non-generation of the vibration motion due to the magnetic force that may be generated between the bracket and the plurality of magnets.

Although the preferred embodiments of the present invention have been disclosed for illustrative purposes, they are for specifically explaining the present invention and thus the linear vibration motor according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A linear vibration motor, comprising:
   a fixed part including a coil applied with power from the outside;
   a vibrator part disposed to be opposite to the coil and including a plurality of magnets having polarities disposed to be opposite to each other and vibrating in a horizontal direction; and
   an elastic member coupled with the outer side of the vibrator part and including a round-shaped bending part to elastically support the vibrator part,
   wherein:
   the vibrator part further includes a weight body coupled with a plurality of magnets, and
   the weight body includes a round shape on a surface corresponding to the bending part formed in the elastic member.

2. The linear vibration motor as set forth in claim 1, wherein the weight body is provided with a receiving groove in order to receive the plurality of magnets therein.

3. The linear vibration motor as set forth in claim 1, wherein the vibrator part is coupled with a plate yoke coupled between the plurality of magnets to increase the collection of magnetic force.

4. The linear vibration motor as set forth in claim 1, wherein the fixed part includes:
   a bracket;
   a printed circuit board coupled with the inner top surface of the bracket; and
   a case formed with an inner space and coupled with the bracket to cover the bracket, the coil being coupled with the printed circuit board.

5. The linear vibration motor as set forth in claim 4, wherein the printed circuit board includes:
   a connection terminal protruded to one side in order to be connected with external components; and
   circuit patterns for applying power to the coil formed on the upper portion thereof.

6. The linear vibration motor as set forth in claim 5, wherein the case is provided with a step part corresponding to the connection terminal in order to expose the connection terminal to the outside.

7. The linear vibration motor as set forth in claim 1, wherein the elastic member includes:
   a first elastic member coupled with one side of the weight body to elastically support both sides of the vibrator part to a vibration direction of the vibrator part; and
   a second elastic member coupled with the other side of the weight body to elastically support both the sides of the vibrator part to the vibration direction of the vibrator part.

8. The linear vibration motor as set forth in claim 7, wherein the first elastic member includes:
   a coupling part coupled with one side of the weight body;
   a U-letter shaped elastic support part elastically supporting both the sides of the vibrator part to the vibration direction of the vibrator part; and
   a round-shaped bending part connecting the coupling part with the elastic support part.

9. The linear vibration motor as set forth in claim 7, wherein the second elastic member includes:
   a coupling part coupled with the other side of the weight body;
   a U-letter shaped elastic support part elastically supporting both the sides of the vibrator part to the vibration direction of the vibrator part; and
   a round-shaped bending part connecting the coupling part with the elastic support part.

10. A linear vibration motor, comprising:
    a fixed part including a plurality of magnets of which polarities are disposed to be opposite to each other;
    a vibrator part disposed to be opposite to the plurality of magnets and including a coil applied with power from the outside and vibrating in a horizontal direction; and an elastic member coupled with the outer side of the vibrator part and including a round-shaped bending part to elastically support the vibrator part,
wherein the vibrator part includes a weight body formed with a receiving groove in order to receive the coil therein and the weight body includes a round shape on a surface corresponding to the bending part of the vibrator part.

11. The linear vibration motor as set forth in claim 10, wherein the fixed part includes:
a bracket;
a printed circuit board coupled with the inner top surface of the bracket and applying power to the coil;
a case formed with an inner space and coupled with the bracket to cover the bracket; and
a conducting member of which one end is fixedly coupled with the coil and the other end is fixedly coupled with the printed circuit board to apply power to the coil.

12. The linear vibration motor as set forth in claim 11, wherein the magnet is coupled with at least any one of the case, the bracket, and the printed circuit board.

13. The linear vibration motor as set forth in claim 10, wherein the elastic member includes:
a first elastic member coupled with one side of the weight body to elastically support both sides of the vibrator part to a vibration direction of the vibrator part; and
a second elastic member coupled with the other side of the weight body to elastically support both the sides of the vibrator part to the vibration direction of the vibrator part.

14. The linear vibration motor as set forth in claim 13, wherein the first elastic member includes:
a coupling part coupled with one side of the weight body;
a U-letter shaped elastic support part elastically supporting both the sides of the vibrator part to the vibration direction of the vibrator part; and
a round-shaped bending part connecting the coupling part with the elastic support part.

15. The linear vibration motor as set forth in claim 13, wherein the second elastic member includes:
a coupling part coupled with the other side of the weight body;
a U-letter shaped elastic support part elastically supporting both the sides of the vibrator part to the vibration direction of the vibrator part; and
a round-shaped bending part connecting the coupling part with the elastic support part.

16. The linear vibration motor as set forth in claim 10, wherein the fixed part is coupled with a plate yoke coupled between the plurality of magnets to increase the collection of magnetic force.

* * * * *